UNITED STATES PATENT OFFICE.

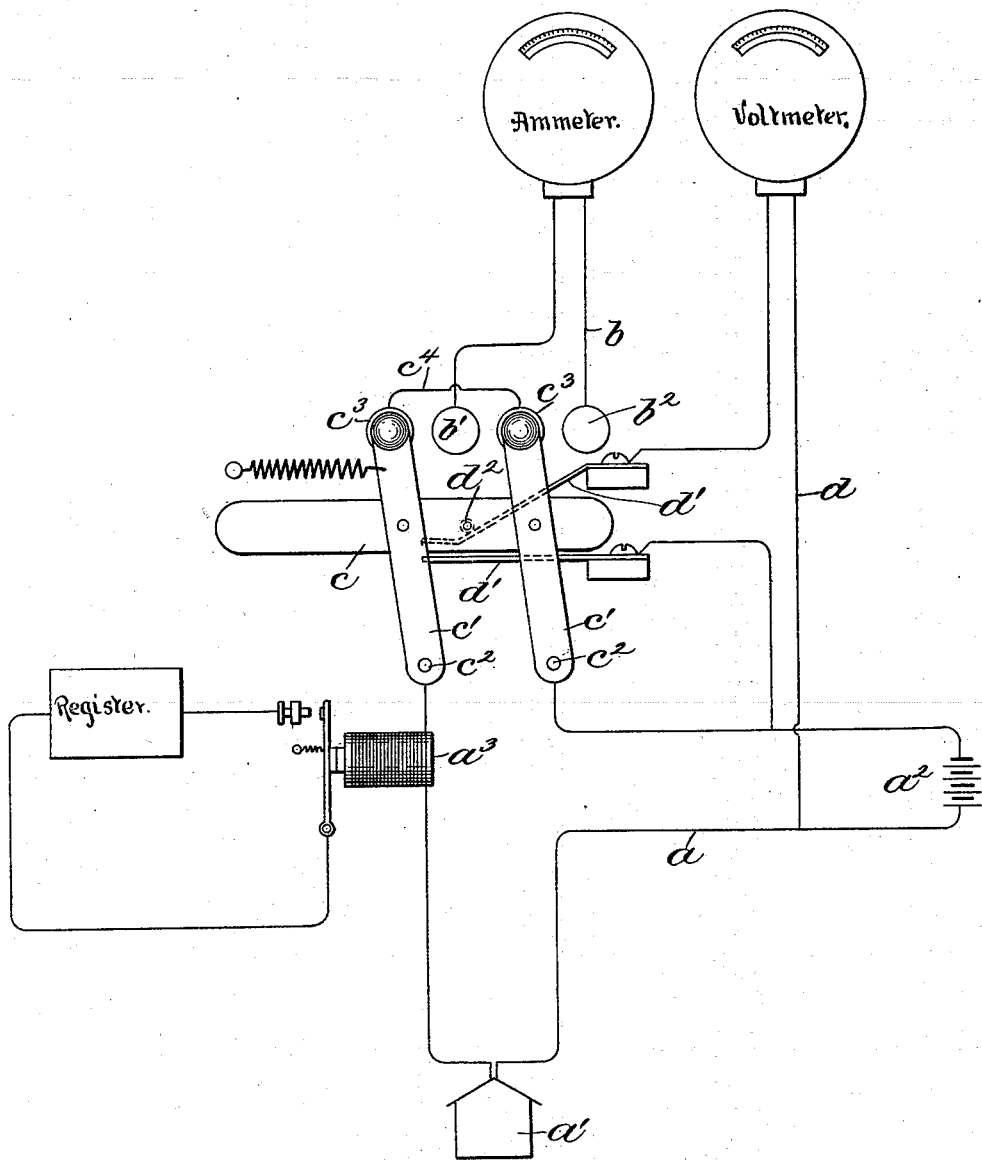

ABNER COLEMAN, OF TAUNTON, MASSACHUSETTS, ASSIGNOR TO THE GAMEWELL FIRE-ALARM TELEGRAPH COMPANY, OF NEW YORK, N. Y.

TESTING APPARATUS FOR ELECTRIC SIGNAL-CIRCUITS.

SPECIFICATION forming part of Letters Patent No. 624,300, dated May 2, 1899.

Application filed May 16, 1898. Serial No. 680,760. (No model.)

*To all whom it may concern:*

Be it known that I, ABNER COLEMAN, of Taunton, county of Bristol, State of Massachusetts, have invented an Improvement in Testing Apparatus for Electric Signal-Circuits, of which the following description, in connection with the accompanying drawings, is a specification, like letters on the drawings representing like parts.

This invention has for its object to provide an electric signaling-circuit with means whereby readings of both an ampere-meter and a voltmeter may be taken at the same time without even temporarily impairing the utility of the circuit for signaling purposes.

The invention consists in the combination, with an electric signaling-circuit, of a normally open branch circuit containing an ampere-meter and a normally open shunt-circuit containing a voltmeter and a switch constructed and arranged to include said branch circuit in series with the signaling-circuit and for simultaneously closing said shunt-circuit.

The drawing shows in diagram an electric signaling-circuit, a branch circuit containing an ampere-meter, and a shunt-circuit containing a voltmeter, and means for including said branch circuit in series with the signaling-circuit and for simultaneously closing said shunt-circuit, thereby enabling readings to be taken from both the ampere and volt meters at the same time.

$a$ represents the signaling-circuit, which, as usual, may contain any number of signal-boxes $a'$, a battery $a^2$, and a receiving instrument $a^3$, which is herein represented as a receiving-relay.

A branch circuit $b$ is provided, which contains an ampere-meter of any well-known or suitable construction, the terminals of said branch circuit being connected, respectively, with the points $b'$ $b^2$, being thereby normally open.

A switch is provided, which is herein represented as a push-bar $c$, loosely connected to the parallel-arranged bars $c'$ $c'$, pivoted at $c^2$ $c^2$, and the upper ends of said pivoted bars normally rest on points $c^3$ $c^3$, which latter are connected together by a wire $c^4$. The bars $c'$ $c'$ are connected in series with the signaling-circuit $a$, as shown, and when the upper ends thereof rest upon the points $c^3$ $c^3$ the signaling-circuit will be completed, and when the push-bar $c$ is thrust inward said bars $c'$ $c'$ will be moved onto the points $b'$ $b^2$, thereby connecting the branch circuit $b$ in series with the signaling-circuit. The points $b'$ $b^2$ will be disposed quite close to the points $c^3$ $c^3$, so that the signaling-circuit will remain intact as the switch is thus operated. A shunt-circuit $d$ is connected to the signaling-circuit $a$ at opposite sides of the battery, and it contains a voltmeter of any well-known or suitable construction, and said shunt-circuit $d$ includes a circuit-closer $d'$, herein represented as a pair of contact-pens, and said contact-pens are normally open, so that said shunt-circuit $d$ will be normally open. The circuit-closer $d'$ is placed beside of or close to the switch and in position to be engaged and acted upon by a pin $d^2$, projecting laterally from said push-bar $c$, and whenever said push-bar is thrust inward said circuit-closer $d'$ will be closed, thereby closing the shunt-circuit containing a voltmeter at the same time that the branch circuit $b$ is included in series with the signaling-circuit. It is obvious that the switch, which is provided for thus simultaneously operating both the branch and shunt circuits, may be constructed in many different ways, all of which come within the spirit and scope of this invention.

I claim—

The combination with an electric signaling-circuit, of a normally open branch circuit containing an ampere-meter, and a normally open shunt-circuit containing a voltmeter, and a switch constructed and arranged to include said branch circuit in series with the signaling-circuit, and for simultaneously closing said shunt-circuit, substantially as described.

In testimony whereof I have signed my name to this specification in the presence of two subscribing witnesses.

ABNER COLEMAN.

Witnesses:
WILLIAM E. DECROW,
WILLIAM C. DAVOL.